Dec. 22, 1964 V. INDELICATO 3,162,194
SPRAY DEVICE
Filed April 13, 1961
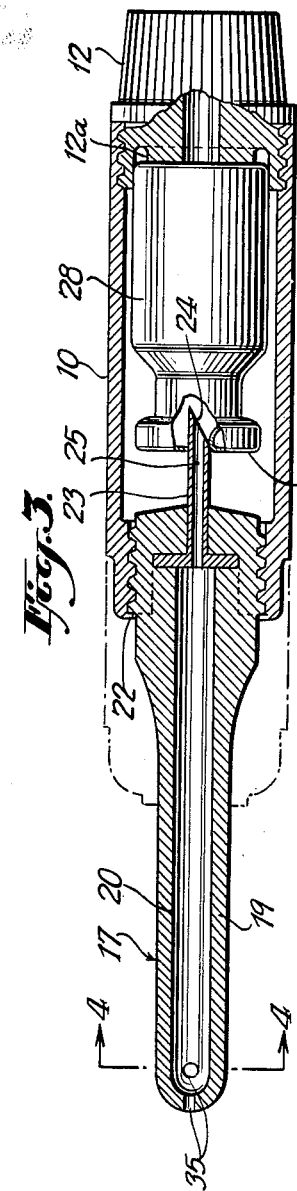
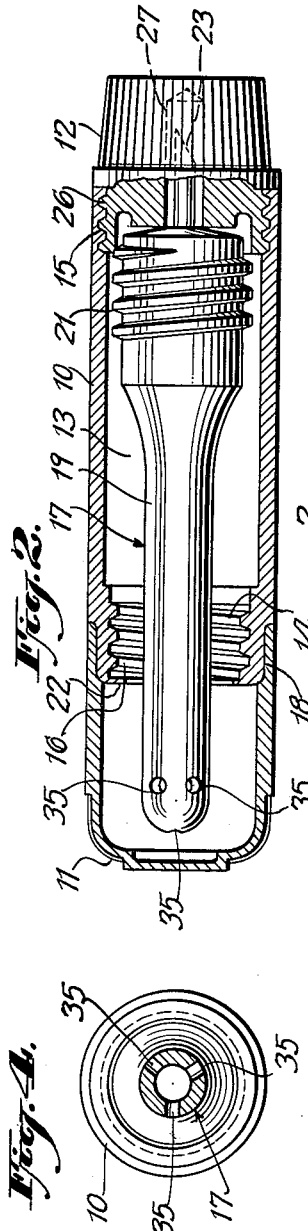
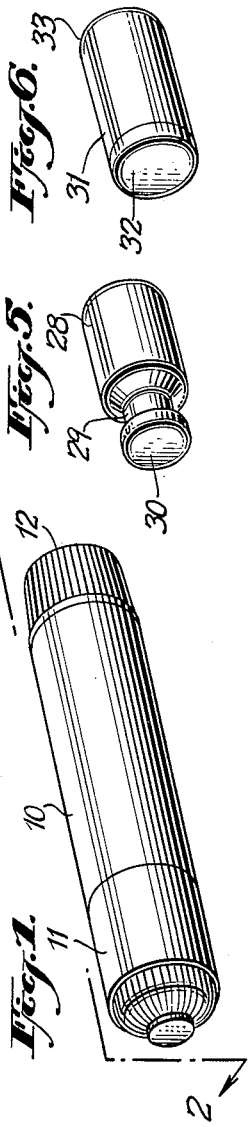
INVENTOR.
VINCENT INDELICATO.
BY
Ward, Neal, Haselton, Orme & McChannon
ATTORNEYS.

United States Patent Office 3,162,194
Patented Dec. 22, 1964

3,162,194
SPRAY DEVICE
Vincent Indelicato, 16 Spring St., New York, N.Y.
Filed Apr. 13, 1961, Ser. No. 102,758
9 Claims. (Cl. 128—261)

This invention relates to a medicinal spray device particularly useful as a vaginal spray device but also useful for other purposes, such as the treatment of anal hemorroids.

It is known in the art that it is sometimes necessary to coat the wall adjacent a body opening such as the vagina or anus, with a germicide for hygenic treatment or other purposes. Many devices for providing such a coating are well known, and for example, take the form of syringes, squeezable tubes with spouts or nozzles, fillable pumps, pressurized, valve operated cans with nozzles or spouts, etc. Such prior art devices have one or more disadvantages because, for example, they are relatively large in size, do not produce sufficient force to disperse the germicide adequately, require filling with each use, are difficult or awkward to use and/or are apt to direct or leak the germicide where it is not desired.

The spray device of the present invention overcomes the foregoing disadvantages and comprises a relatively small housing having a nozzle which preferably is extensible from the housing and having a portion for receiving at least a portion of a sealed container or capsule containing a germicide and a gas propellant under a pressure exceeding atmospheric pressure. Means are also provided for releasing the germicide from the container so that it flows through the nozzle and is sprayed against the surface which is to be coated. The housing and nozzle may be reuseable or can be inexpensively made so as to be disposable after use. The container or capsule preferably contains a unit dose and may be thrown away after use.

It is one object of the invention to provide a spray device which is relatively small in size, light in weight, easy to use and effective for providing a proper dispersion of a germicide.

It is a further object of the invention to provide a spray device which does not have the foregoing disadvantages of the prior art devices and which will facilitate the application of germicides to parts of the human body to be treated by the germicide.

Other objects and advantages of the invention will be apparent from the following detailed description of preferred embodiments thereof which description should be considered in conjunction with the accompanying drawing in which:

FIG. 1 is a perspective view of the preferred embodiment of the invention and shows the spray device in slightly larger than full size and with the sealed conthaner removed;

FIG. 2 is an enlarged cross-sectional side elevation view of the embodiment shown in FIG. 1 and is taken along the line 2—2 indicated in FIG. 1;

FIG. 3 is a cross-sectional side elevation view of the embodiment illustrated in the preceding figures but with the parts thereof in position for use;

FIG. 4 is an end elevation view partly in cross-section of the embodiment illustrated in the preceding figures and is taken along the line 4—4 indicated in FIG. 3, and FIGS. 5 and 6 are perspective views respectively of the sealed container shown in FIG. 3 and of a modified form of the sealed container.

As illustrated in FIG. 1, the preferred embodiment of the spray device comprises a cylindrical housing 10 having an end cap 11 which may frictionally engage the end of the housing 10 and an end cap 12 in threaded engagement with the housing 10. The end cap 12 may be knurled at the periphery thereof as illustrated to facilitate gripping of the cap 12 during turning thereof.

Upon referring to FIGS. 2-4, it will be seen that the housing 10 is substantially cylindrical and has a central bore 13. At its opposite ends the housing 10 is provided with internally threaded portions 14 and 15. The threaded portion 14 terminates just below the end 16 of the housing 10 to provide a rim or stop 22 for the nozzle 17 hereinafter described. The housing 10 has a reduced portion 18 for frictionally engaging the end cap 11.

The nozzle 17 has a longitudinally extending portion 19 with a longitudinally extending passageway 20 (FIG. 3) and the end of the longitudinally extending portion 19 has a plurality of holes or apertures 35 therein which extend from the exterior of the nozzle 17 to the passageway 20. It will be apparent to those skilled in the art that the portion 19 may be differently shaped and the holes 35 may be different in number and/or differently disposed.

The opposite end of the nozzle 17 has a threaded portion 21 which mates with the threaded portion 14 on the housing 10. The major portion of the nozzle 17 is slidably receivable in the bore 13 and when the nozzle 17 is moved outwardly of the bore 13, such as sliding it to the left as viewed in FIGS. 2 and 3, the threaded portion 21 engages with the threaded portion 14. After the threaded portions have become engaged the nozzle 17 may be rotated until it assumes the position illustrated in FIG. 3. The rotation of the nozzle 17 is limited by the rim 22 at the end of the housing 10, and in the position shown in FIG. 3, the nozzle 17 forms a fluid-tight seal with the housing 10.

The nozzle 17 is also provided at the threaded end portion with a puncturing projection or needle 23. The projection or needle 23 has a sloping end 24 and a central passageway 25 extends through the length of the projection 23 and communicates with the passageway 20 in the nozzle 17.

The end cap 12 has an externally threaded portion 26 which mates with the internally threaded portion 15 on the housing 10 and has an aperture or cavity 27 therein for receiving the projection 23 when the parts of the spray device are in their carrying relationship illustrated in FIG. 2.

The spray device of the invention is adapted for use with a puncturable sealed container of the type illustrated in FIGS. 5 and 6. The sealed container 28 illustrated in FIG. 5 has a neck portion 29 and an end wall 30 which is relatively thin as compared with the remaining wall portions of the container 28. The container 28 illustrated in FIG. 5 has only a single puncturable wall portion 30, and the neck 29 is provided to permit identification of the puncturable end by touch without requiring visual observation of the container 28.

If desired, the sealed container may take the cylindrical form illustrated at 31 in FIG. 6, the container 31 having two puncturable end walls 32 and 33, each of which is thinner than the remaining wall portions of the container 31. Thus, with the container 31 illustrated in FIG. 6, the container may be disposed with either end, that is, either end 32 or end 33 adjacent the puncturing projection 23 of the spray device.

The sealed container, either 28 or 31, preferably contains a germicide, a foamable material and a gas propellant. After the nozzle 17 is extended to the position illustrated in FIG. 3 and the cap 12 is removed, the sealed container 28 is inserted in the bore 13 of the housing 10. The threaded portion 26 of the end cap 12 is then engaged with the threaded portion 15 of the housing 10 and rotated slightly so as to provide firm engagement of the threaded portions. However, the end cap 12 is not turned an amount sufficient to cause the projection 23 to penetrate the puncturable end wall 30 of the container or capsule 28. The nozzle 17 is then inserted in the body opening adjacent the surface to be treated and the end cap 12 is further rotated. Because of the engagement of the portion 12a with an end of the container 28, the puncturable portion 30 of the container 28 is pressed against the projection 23, and with continued rotation of the cap 12, the projection 23 punctures the end wall portion 30 and permits the gas propellant to force the mixture of the germicide and foamable material through the passageway 25 in the projection 23, through the passageway 20 in the nozzle 17, and outwardly of the nozzle 17 through the openings 35. Due to the force supplied by the gas propellant, the germicide-foamable material mixture is sprayed outwardly from the openings 35 and coats the adjacent surfaces with a foamed layer of the foamable material and germicide.

After the layer of germicide and foamable material has been applied, the container 28 may be removed by removing the end cap 12 and either shaking the container 28 from the housing 10 or turning the nozzle 17 until the threaded portion 21 becomes disengaged from the threaded portion 14, and sliding the nozzle 17 to the right as viewed in FIGS. 2 and 3 until the container 28 extends from the housing 10 so it can be removed by hand.

In the preferred form of the invention, the sealed container, such as the container 28 or 31, contains a unit dose of the medicine or germicide which it is desired to apply, and therefore, it may be disposed of after the germicide has been applied. Containers of the type illustrated are well known per se and may, for example, be inexpensively constructed of thin aluminum, noncorrosive metals or plastics. It has been found to be unnecessary to include a dip tube in such containers which differs from conventional practice with conventional containers which include a sprayable material and a gas propellant. The spray device comprising the housing 10, the nozzle 17, and the end caps 11 and 12 may be constructed of a synthetic resin such as polyethylene, polystyrene, cellulose acetate, etc. Thus, the spray device itself may also be made inexpensively enough for it to be disposable after use, but it may also be retained and carried in the arrangement illustrated in FIGS. 1 and 2 for further use with a new sealed container, such as the container 28 or 31.

Since it is desirable to keep the size of the spray device as small as possible when it is not in use, the nozzle 17 preferably is made extensible as illustrated in FIGS. 2 and 3. However, if desired, in order to simplify the construction and reduce the cost of manufacture thereof, the nozzle 17 may be maintained permanently in the position shown in FIG. 3, the nozzle 17 being sealed or otherwise secured to the end of the housing 10 in any well known manner. With such construction, the cap 11 may be longer than that illustrated in the drawings so as to cover the nozzle 17 in its extended position. Furthermore, the housing 10 and the caps 11 and 12 may be constructed of a relatively inexpensive material such as stiff cardboard so that the cost of making the spray device will be small and the spray device may be readily disposable.

The projection or needle 23 may be formed of the same material as the nozzle 17 and may be formed as an integral part thereof. On the other hand, the projection 23 may be formed separately and of a different material such as stainless steel and may be secured to the nozzle 17 such as by being interposed between the threaded portion 21 and the portion 19 as illustrated in FIG. 3. With such an arrangement, the threaded portion 21 may be cemented or otherwise secured in any well known manner to the portion 19.

If a relatively thin and watery germicide is contained in the sealed container, such as the container 28 or 31, only a relatively thin coating or layer will be produced on the surface to be treated and such coating or layer may provide poor protection or may rapidly lose its efficacy. Accordingly, in the preferred form of the invention, the sealed container contains the mixture of the medicine or germicide, a foamable material, and a gas which is soluble in the mixture of the germicide and the foamable material. A gas which is soluble in the mixture, such as dichlorodifluoromethane, is preferred because this provides the desired foaming and spraying action, whereas, other types of gas propellants, e.g. nitrogen, merely force the germicide out of the nozzle in the form of a liquid stream. There are many well known germicides which are suitable for treatment purposes, and there are many well known foamable materials. Generally speaking, the foamable materials have a nature of a soap and when mixed with a suitable gas causes the soap to foam. An example of a suitable form of a germicide, foamable material and gas propellant mixture is as follows:

(a) Foamable or soap materials:
   1.5% coconut oil
   1.7% potassium hydroxide
   0.1% sodium hydroxide
   6% stearic acid
   0.5% ricinoleic acid
(b) Germicides:
   0.1% hexylresorcinol
   .0077% chlorothymol
(c) Carriers:
   1% glycerin
   0.1% mineral oil
   81% water
(d) Propellant:
   8% dichlorodifluoromethane—sold under the Trademark "Freon" and preferably this amount of the propellant consists of 40% of the type sold as "Freon" 12 and 60% of "Freon" 114.

All of the above percentages are percentages by weight.

Formulations other than the formulations set forth above may be employed but as pointed out above, in order to provide a relatively thick and stable layer, it is preferable to include a foamable material with the germicide. The dichlorodifluoromethane is mixed with the germicide and foamable materials at low temperatures in the manner well known in the art and the resulting mixture is inserted in the container which is then sealed. The amount of the dichlorodifluoromethane employed preferably is such as to provide a gas pressure of at least twice atmospheric pressure at room temperature and preferably a gas pressure within the range from approximately 35–50 pounds per square inch. With such a pressure sufficient force is developed to provide a complete dispersion of the germicide-foamable material mixture over the surface to be treated and in addition, the pressure is sufficiently low to prevent any discomfort to the user.

Although I have illustrated in the drawings the preferred embodiment of the invention with parts of shapes which have been found to be desirable, it will be apparent that other similar shapes may be employed. In addition, if the housing 10 is made longer so as to substantially completely receive the nozzle 17, the cap 11 may be made shorter or may be eliminated. Also the projection 23 may have a different shape, may be made shorter, or may have passageways other than the passageway 25 therethrough.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A medicinal spray device comprising a substantially cylindrical housing having a tubular bore, a nozzle which is long relative to its cross section and which has one end thereof slidably received in said bore, said nozzle being slidable longitudinally of said bore from a first position in which a substantial lengthwise portion thereof is within said bore to a second position in which a major portion of said nozzle and the opposite end thereof extend from said housing and said nozzle having a longitudinally extending tubular passageway therein and having openings at said opposite end thereof extending from said passageway to the exterior of said nozzle, cooperating stop means at one end of said housing and at said one end of said nozzle for maintaining said nozzle in said second position, puncturing means mounted on said nozzle at said one end thereof and having a passageway therein communicating with said passageway in said nozzle, pressing means at the opposite end of said housing movable in a direction longitudinally of said bore, and means interconnecting said housing and said pressing means for moving said pressing means in said direction.

2. A medicinal spray device comprising a substantially cylindrical housing having a tubular bore, a nozzle which is long relative to its cross section and which has one end thereof slidably received in said bore, said nozzle being slidable longitudinally of said bore from a first position in which a substantial lengthwise portion thereof is within said bore to a second position in which a major portion of said nozzle and the opposite end thereof extend from said housing and said nozzle having a longitudinally extending tubular passageway therein and having openings at said opposite end thereof extending from said passageway to the exterior of said nozzle, cooperating stop means at one end of said housing and at said one end of said nozzle for maintaining said nozzle in said second position, puncturing means mounted on said nozzle at said one end thereof and having a passageway therein communicating with said passageway in said nozzle, said housing having threads at the opposite end thereof, and a threaded cap having threads engageable with the threads on said opposite end of said housing and thereby being movable longitudinally of said bore upon rotation of said cap.

3. A medicinal spray device comprising a substantially cylindrical housing having a tubular bore, a nozzle which is long relative to its cross section and which has one end thereof slidably received in said bore, said nozzle being slidable longitudinally of said bore from a first position in which a substantial lengthwise portion thereof is within said bore to a second position in which a major portion of said nozzle and the opopsite end thereof extend from said housing and said nozzle having a longitudinally extending tubular passageway therein and having openings at said opposite end thereof extending from said passageway to the exterior of said nozzle, said housing having internal threads at one end thereof and said nozzle having external threads at its said one end which mate with said internal threads in said second position of said nozzle, puncturing means mounted on said nozzle at said one end thereof and having a longitudinal passageway therein communicating with said passageway in said nozzle, said housing having threads at the opposite end thereof, and a threaded cap having threads engageable with the threads on said opposite end of said housing and thereby being movable longitudinally of said bore upon rotation of said cap.

4. A medicinal spray device comprising a substantially cylindrical housing having a tubular bore, a nozzle which is long relative to its cross section and which has one end thereof slidably received in said bore, said nozzle being slidable longitudinally of said bore from a first position in which a substantial lengthwise portion thereof is within said bore to a second position in which a major portion of said nozzle and the opposite end thereof extend from said housing and said nozzle having a longitudinally extending tubular passageway therein and having openings at said opposite end thereof extending from said passageway to the exterior of said nozzle, cooperating stop means at one end of said housing and at said one end of said nozzle for maintaining said nozzle in said second position, puncturing means mounted on said nozzle at said one end thereof and having a longitudinal passageway therein communicating with said passageway in said nozzle, said housing having threads at the opposite end thereof, a threaded cap having threads engageable with the threads on said opposite ends of said housing and thereby being movable longitudinally of said bore upon rotation of said cap, and a sealed container mounted in said bore intermediate said cap and said puncturing means and having a puncturable end disposed adjacent said puncturing means, said container containing a mixture of a germicide, a foamable material and a gas at a pressure at least twice atmospheric pressure.

5. A medicinal spray device comprising a substantially cylindrical housing having a tubular bore, a nozzle which is long relative to its cross section and which has one end thereof slidably received in said bore, said nozzle being slidable longitudinally of said bore from a first position in which a substantial lengthwise portion thereof is within said bore to a second position in which a major portion of said nozzle and the opposite end thereof extend from said housing and said nozzle having a longitudinally extending tubular passageway therein and having openings at said opposite end thereof extending from said passageway to the exterior of said nozzle, said housing having internal threads at one end thereof and said nozzle having external threads at its said one end which mate with said internal threads in said second position of said nozzle, puncturing means mounted on said nozzle at said one end thereof and having a longitudinal passageway therein communicating with said passageway in said nozzle, said housing having threads at the opposite end thereof, threaded caps having threads engageable with the threads on said opposite ends of housing and thereby being movable longitudinally of said bore upon rotation of said cap, and a sealed container mounted in said bore intermediate said cap and said puncturing means and having a puncturable end disposed adjacent said puncturing means, said container containing a mixture of a germicide, a foamable material and a gas at a pressure at least twice atmospheric pressure.

6. A medicinal spray device adapted for use with a puncturable, sealed container containing a sprayable material and a propellant therefor under pressure above atmospheric pressure, said device comprising a housing for receiving a portion of said container, a nozzle mounted on and extending from said housing with one end of said nozzle in engagement with said housing and held in a fixed position thereon and with the opposite end thereof exterior to and spaced from said housing, said nozzle having a passageway therein extending between said ends of said nozzle and said nozzle having openings at said opposite end thereof extending from said passageway to the exterior of said nozzle, puncturing means at said one end of said nozzle adapted to engage a portion of said container in said housing for puncturing said container and directing said material from said container to said passageway in said nozzle and pressing means on said housing engageable with said container for pressing said container against said puncturing means, said pressing means and said housing having cooperating cam means for forcing said pressing means and said container toward said puncturing means.

7. A medicinal spray device as set forth in claim 6 wherein said housing has a tubular bore for receiving said container, said puncturing means is disposed at one end of said bore and said pressing means comprises a cap at the opposite end of said bore and forming a closing wall for said opposite end of said bore.

8. A medicinal spray device comprising a housing having a tubular bore, a puncturable, sealed container containing a germicide and a gas propellant therefor in solution therein and under pressure above atmospheric pressure mounted in said tubular bore, a nozzle mounted on and extending from said housing with one end of said nozzle in engagement with said housing at one end of said bore and held in a fixed position thereon and with the opposite end thereof exterior to and spaced from said housing, said nozzle having a passageway therein extending between said ends of said nozzle and said nozzle having openings at said opposite end thereof extending from said passageway to the exterior of said nozzle, puncturing means at said one end of said nozzle adapted to engage an end of said container for puncturing said container and directing said germicide from said container to said passageway in said nozzle, and pressing means on said housing engageable with the opposite end of said container for pressing said container against said puncturing means, said pressing means and said housing having cooperating cam means for forcing said pressing means and said container toward said puncturing means.

9. A medicinal spray device comprising a housing having a tubular bore, a puncturable, sealed container containing a germicide and a gas propellant therefor in solution therein and under pressure above atmospheric pressure mounted in said tubular bore, a nozzle mounted on said housing with one end of said nozzle received within said bore, said nozzle being retractable into said bore in the absence of said container and being extensible from said housing, said nozzle in the extended position thereof having said end thereof in engagement with one end of said housing, said end of said nozzle and said housing having co-operating stop means for maintaining said nozzle in said extended position of said nozzle, the opposite end of said nozzle being exterior to and spaced from said housing in said extended position of said nozzle, said nozzle having a passageway therein extending between said ends of said nozzle and said nozzle having openings at said opposite end thereof extending from said passageway to the exterior of said nozzle, puncturing means at said one end of said nozzle adapted to engage an end of said container for puncturing said container and directing said germicide from said container to said passageway in said nozzle, and a cap in threaded engagement with the opposite end of said housing and engageable with the opposite end of said container for pressing said container against said puncturing means.

References Cited by the Examiner
UNITED STATES PATENTS

| | | | |
|---|---|---|---|
| 2,536,001 | 12/50 | Chase | 62—91.5 |
| 2,566,823 | 9/51 | Cariffe | 128—225 |
| 2,574,028 | 11/51 | Fields et al. | 222—5 |
| 2,649,089 | 8/53 | Fallon | 128—225 |
| 2,674,998 | 4/54 | Boehm | 128—184 |
| 2,854,925 | 10/58 | Crockford et al. | 128—215 |
| 2,880,723 | 4/59 | Adams | 128—215 |
| 2,957,501 | 10/60 | Holmes | 141—2 |
| 2,970,399 | 2/61 | Frohlich et al. | 43—6 |
| 3,109,562 | 11/63 | Ferris | 222—81 |

LOUIS R. PRINCE, *Primary Examiner.*

ADELE M. EAGER, *Examiner.*